US005782300A

United States Patent [19]

James et al.

[11] Patent Number: 5,782,300
[45] Date of Patent: Jul. 21, 1998

[54] SUSPENSION AND POROUS PACK FOR REDUCTION OF PARTICLES IN SUBTERRANEAN WELL FLUIDS, AND METHOD FOR TREATING AN UNDERGROUND FORMATION

[75] Inventors: Simon Gareth James; Paul Richard Howard, both of Tulsa, Okla.

[73] Assignee: Schlumberger Technology Corporation, Sugar Land, Tex.

[21] Appl. No.: 748,446

[22] Filed: Nov. 13, 1996

[51] Int. Cl.$^6$ .................................... E21B 43/267
[52] U.S. Cl. .................... 166/278; 166/280; 507/924
[58] Field of Search .................... 166/278, 280, 166/295, 308; 507/269, 924

[56] References Cited

U.S. PATENT DOCUMENTS

| | | | |
|---|---|---|---|
| 5,330,005 | 7/1994 | Card et al. | 166/280 |
| 5,439,055 | 8/1995 | Card et al. | 166/280 |
| 5,501,274 | 3/1996 | Nguyen et al. | 166/276 |
| 5,501,275 | 3/1996 | Card et al. | 166/280 |
| 5,520,250 | 5/1996 | Harry et al. | 166/280 X |
| 5,582,249 | 12/1996 | Caveny et al. | 166/280 X |
| 5,597,784 | 1/1997 | Sinclair et al. | 507/269 X |

OTHER PUBLICATIONS

Hayes, Jr., Joseph S. (1981). "Novoloid Fibers in Friction and Sealing Materials." *Kirk–Othmer: Encyclopedia of Chemical Technology*, (vol 16, Third Edition, pp. 125–138). New York.

Hayes, Jr., Joseph S. (1993). "Novoloid and Related Fibers in Nonwoven Structures." Index 93 Congress, Session 2C—Fibers, Geneva.

Hayes, Jr., Joseph S., "Novoloid Fibers." *Kirk–Othmer: Encyclopedia of Chemical Technology*, vol. 16, pp. 125–138 (1981).

Minthorn, W. and Gavin, T. (1991). Successful Applicaton of New Technology in Antrim Shale Completions. SPE Society of Petroleum Engineers, Inc., pp. 71–76, Kentucky.

*Primary Examiner*—David J. Bagnell
*Attorney, Agent, or Firm*—John E. Vick, Jr.

[57] ABSTRACT

The addition of specific fibrous, platelet, and/or fibrous and platelet compositions in mixtures with particulates for or during well treatment procedures such as fracturing and gravel packing decreases or eliminates the undesirable transport or flowback of proppant or formation particulates. Novoloid and novoloid-type polymer material may be used for forming a porous pack in a subterranean formation.

43 Claims, No Drawings

SUSPENSION AND POROUS PACK FOR REDUCTION OF PARTICLES IN SUBTERRANEAN WELL FLUIDS, AND METHOD FOR TREATING AN UNDERGROUND FORMATION

FIELD OF THE INVENTION

This invention relates to the recovery of hydrocarbons from subterranean wells, and particularly to the reduction or inhibition of flow or flowback of particulate solids from a subterranean formation. The invention is especially suited for well treatment wherein the use of fibers or plate-like materials in a porous pack is considered for inhibiting the flow of solid particulates from a formation or hydraulic fracture.

BACKGROUND OF THE INVENTION

Undesired transport or flowback of formation or particulate solids during the production of oil or other fluids from a subterranean formation can be a serious problem in production operations. For example, transported particulate solids from the formation may clog a wellbore, limiting or completely stopping production of the fluid. Additionally, the solids being transported may substantially increase fluid friction, thereby increasing pumping requirements, and may cause significant wear in production equipment, particularly in the pumps and seals used in the production process. Finally, undesired particulate solids in a recovered product fluid must be separated to render the product fluid commercially useful.

In some instances, undesired particulate flowback may be the result, not of formation characteristics, such as a lack of consolidation, but of the flowback of proppant utilized in a fracturing operation. When flowback of proppant occurs, the proppant particles become undesirable contaminants in the manner of any undesired formation particulate solids, since they can cause the same operational difficulties.

Numerous procedures and compositions have been developed in order to overcome the problem of undesirable particulates' transport or flowback. For example, in unconsolidated formations, it is common practice to provide a filtration bed of gravel in the area near the bottom of the wellbore to inhibit transport of unconsolidated formation particulates in the wellbore fluids. Typically, such so-called "gravel packing" operations involve the pumping and placement of a quantity of gravel and/or sand having a mesh size between 10 and 60 mesh (U.S. Standard Sieve Series) into the unconsolidated formation adjacent the bottom of the wellbore. In other instances, gravel or proppant particles may be bound together to form a porous matrix, thus facilitating the filtering out and retention of the bulk of the unconsolidated particles transported to the wellbore area. Often, the gravel particles or proppant particles are resin-coated, the resin being pre-cured or cured in situ by a flush of a chemical binding agent. In other cases, binding agents have been applied to gravel particles to form the porous matrix.

As will be evident, gravel packing can be an expensive and elaborate procedure, and, unfortunately, does not completely eliminate the production of formation particulates. Additionally, some wellbores are not stable, and thus cannot be gravel packed.

U.S. Pat. No. 5,330,095; U.S. Pat. No. 5,439,055; and U.S. Pat. No. 5,501,275 provide a different approach for reducing particulate flowback. These patents disclose the use of fibrous and other materials, suitably dispersed in a porous pack, for inhibiting particulate flowback. Materials employed include, but are not limited to, fibers of glass, ceramics, carbon, and polymers, and platelets of glass, metal, and polymers. However, notwithstanding the efficacy of the inventions described in these patents, there is room for even greater efficiency in controlling or inhibiting particulate solids transport. In particular, various conditions, such as the existence of subterranean formations of relatively high temperature, e.g., up to 500° F., the use of acids (acidization) and/or organic solvents, in the porous pack, or the need for long lifetimes for the fiber or platelet material, often place special requirements in the selection of the material to be dispersed in the porous pack. The invention, therefore, is directed to compositions and procedures to provide improved control or reduction of particulates' transport or flowback under stringent conditions.

SUMMARY OF THE INVENTION

Accordingly, in one embodiment, the invention relates to a fluid suspension for treatment of a subterranean formation comprising a fluid, a particulate material, and a solid material selected from fibers and platelets of novoloid, or mixtures thereof; fibers and platelets of a novoloid-type polymer material, and mixtures thereof; and mixtures thereof. As utilized herein, the term "novoloid" is understood as generally designating a phenolic polymeric material containing at least eighty-five weight percent of a crosslinked novolac resin, while "novoloid-type polymer material" is understood to refer to uncured novolac resin and derivatives (other than novoloid) of such resin, or of novoloid, which exhibit or retain substantially physical and chemical characteristics common to novoloid. In a further embodiment, the invention relates to a method or process of treating an underground formation penetrated by a wellbore comprising providing a fluid suspension which is comprised of a fluid, a particulate material, and a solid material selected from fibers and platelets of novoloid, or mixtures thereof; fibers and platelets of a novoloid-type polymer material, and mixtures thereof; and mixtures thereof; pumping the fluid suspension downhole through a wellbore; depositing the fluid suspension in the formation; and forming within the formation a porous pack of particulate material and the solid material. In this embodiment, the particulate material is preferably a proppant, and the deposition is carried out as an adjunct of a fracturing procedure.

In yet a further aspect, the invention relates to a novel porous solid pack that inhibits the flow of both deposited particulate material and/or natural formation particulate solids back through the wellbore with fluids from the formation. In the practice of this embodiment, a porous pack is developed in the formation that is an intimate mixture comprised of a particulate material, such as proppant, and fibers or platelets, or fibers and platelets, of the polymeric material above-described. As used herein, the phrase "intimate mixture" is taken to indicate a substantially uniform dispersion of the components in a mixture. Voids, sometimes referred to as "channels", may be generated in the porous pack. Such channels may be located within the structure of the porous pack, and serve to provide a permeable barrier that retards flowback of particles, while allowing production of the hydrocarbon fluid at acceptable levels.

DETAILED DESCRIPTION OF THE INVENTION

The liquid or other fluid employed to form the suspension with the particulate material and fibers or platelets, or fibers and platelets component of the invention, is largely a matter of choice and per se forms no part of the present invention. In general, any suitable fluid or liquid which provides sufficient viscosity to transport the solid components into the wellbore area or fracture, does not unduly interfere with the effectiveness of the solid material of the invention, and which results in minimal damage to the pack and to the formation, may be used, it being understood that the term "fluid", with respect to the liquid or gas employed, includes mixtures of such materials. As those skilled in the art will be aware, however, the fluid, particulate material, and solid material must be compatible or inert to each other in the sense that they do not react with one another or otherwise deleteriously interfere to any significant extent with the designed functions of each, and the particular fluid chosen will be determined by such considerations as treating temperature, concentration of solid material to be carried, and the desired objective. The fluid may be aqueous or non-aqueous, and may, as indicated, comprise a gas, i.e., foam may be employed. Any common well treatment fluid may be employed, keeping the requirements previously mentioned in mind, preferred fluids comprising uncrosslinked solutions of cellulose or guar, or derivatives thereof, including those containing borate, titanium, or zirconium crosslinked components. Fluids containing crosslinked additives such as those described in U.S. Pat. No. 4,683,068 and U.S. Pat. No. 5,082,579 may be used. Suitable fluids may also include aqueous solutions of viscoelastic surfactants, i.e., surfactants which are capable of providing viscosity without requiring the addition of polymers. Fluids comprising water-in-oil or oil-in-water emulsions may be used. Particularly preferred are the type of fracturing fluids described by Nimerick, Crown, McConnell, and Ainley in U.S. Pat. No. 5,259,455, and those disclosed in U.S. Pat. No. 4,686,052. Proportions of the components of the fluid suspension are selected to insure that fluid character, i.e., flowability, and suspension of the particulate material and solid material are maintained during pumping or down well transport, i.e., an amount of the well treatment fluid or liquid is provided or present sufficient to insure fluid flow characteristics for the compositions. Generally, the composite fluids or fluid suspensions of the invention will comprise viscous liquids.

Similarly, the particulate material employed is not critical, being selected for a particular purpose, such as "propping" open a fracture, and those skilled in the art may readily select an appropriate solid or solids for the desired purpose. The expressions "particulate material" and "proppant" are understood to include mixtures, and may include, for example, a mixture of different sized proppants, or a gravel. In general, the particulate material used as a well treatment solid will have an average particle size of from about 10 to about 100 U.S. mesh. Sized sand and synthetic inorganic proppants are the most common, with 40/60 sized sand, 20/40 sized sand, 16/20 sized sand, 12/20 sized sand, 8/12 sized sand, and similarly sized ceramic proppants such as "CARBO-LITE™" proppants being acceptable. Resin coated sand or ceramic proppant may be used. Particles or beads of silica, sintered materials or minerals, such as sintered bauxite, alumina, or corundum, may be used. Normally, the particulate material, such as proppant, will be added or present in the fluid in a concentration of from 1 lb/gallon to about 25 lbs/gallon, preferably from 1 lb/gallon to about 20 lbs/gallon.

In forming the porous pack of the invention, the fluid or fluid suspension comprising or containing particulate material, such as a proppant, and the fibers, platelets, or fibers and platelets of the invention, may be deposited in a formation or in the wellbore area by known procedures. The fluid component is then allowed to leak off into the formation or into the formation and/or wellbore, or, in the case of deposition in a fracture, forced back into the wellbore by release of fracturing pressure. The resultant porous structure or pack formed comprises the particulate material or proppant and the fibers, platelets, or fibers and platelets of the invention.

The fibers or platelets of the invention utilized in inhibiting solids or particle transport or flowback are comprised or composed of a selected class of materials, novoloid or novoloid-type polymer material. Mixtures of the fibers or platelets may be employed, in all proportions. As indicated, novoloid is a phenolic polymer of varying chemical composition derived from novolac resin by suitable curing, such as by formaldehyde or hexamethylenetetramine, as described more fully in *Encyclopedia of Chemical Technology*, Kirk-Othmer, Vol. 16, pages 125 to 138; and *Novoloid and Related Fibers in Nonwoven Structures*, Hayes, Jr., Index 93 Congress, Session 2C-Fibres, Geneva: Apr. 20, 1993. Novoloid fibers are considered to have a chemical composition radically different from other fibers (Kirk-Othmer, supra, page 125). Novoloid-type polymer material includes novolac resin, a phenolic resin, and derivatives of novoloid, such as acetylated novoloid fiber (Kirk-Othmer, supra), which exhibit many characteristics of novoloid, and which may be used in the invention. Novoloid and novolac resin are available commercially, and the preparation of the acetylated derivative is described in the Kirk-Othmer encyclopedia. Fibers and platelets of the compositions used in the invention may be produced by suitable techniques, and procedures for preparing the compositions, with the exception of the in situ preparation discussed hereinafter, or of the manner of forming the fibers or platelets, per se form no part of the invention.

The fiber, or fiber and/or platelet containing fluids used in the invention may be formed by blending the fibers, or fibers and/or platelets with the fluid used or any components, e.g., proppant, used in its makeup, in any suitable manner or sequence. For example, the fluid, such as a fracturing fluid, or make-up components thereof, may be blended with or added to fibers, or, preferably, the fibers or platelets, or mixture thereof, are added to the fluid or one or more of its makeup components. Additional components, such as inorganic solids, may be added prior to or subsequent to the blending. Commonly, the solid material for inhibiting solids transport or flowback may simply be added directly to a suitable fluid, and the material may be mixed throughout the entire batch of particulate material to be pumped during the job. Preferably, in the case of novoloid fibers, the fibers are "wetted" with a suitable fluid, such as water or a well treatment fluid, before or during mixing with a particulate material, to allow better feeding of the fibers to blending equipment. Novolac resin fibers or fibers and/or platelets may be added to a fluid, along with particulate material, such as proppant, deposited as a pack in a formation, and flushed with a suitable curing agent to cure at least a portion of the resin component(s) in situ.

In accordance with the invention, individual fiber lengths may range upwardly from about 2 millimeters, while fiber diameter may vary from about 3 microns to about 200 microns. There appears to be no upper limit on the length of the fibers employed from the standpoint of stabilization. However, practical limitations of handling, mixing, and pumping equipment currently limit the practical use length of the fibers to about 100 millimeters. The fiber level, i.e., concentration, used in the proppant pack may range from 0.01% to 50% by weight of the particulate material or proppant. Preferably, however, the fiber concentration ranges from about 0.1% to about 5.0% by weight of proppant.

Novoloid or novoloid-type fibers having a wide range of dimensions are useful. A ratio of length to diameter (assuming the cross section of the fiber to be circular) in excess of 50 is preferred. However, the fiber can have a variety of shapes ranging from simple round or oval cross-sectional areas to more complex trilobe, figure eight, star shaped, rectangular cross-sectional areas or the like. Preferably, straight fibers with round or oval cross sections will be used. Curved, crimped, spiral-shaped and other three dimensional fiber geometries may be used. Likewise, the fibers may be hooked on one or both ends. Novoloid or novoloid-type fibers have relatively low modulus values. Surprisingly, smaller diameter fibers of novoloid have given good results in tests to determine ability to hold particulates, although there is evidence that larger diameter fibers will give superior permeability.

Those skilled in art will recognize that a dividing line between what constitute "platelets", on one hand, and "fibers", on the other, tends to be arbitrary, with platelets being distinguished practically from fibers by having two dimensions of comparable size both of which are significantly larger than the third dimension, fibers generally having one dimension significantly larger than the other two, which are similar in size. As used herein, the terms "platelet" or "platelets" are employed in their ordinary sense, suggesting flatness or extension in two particular dimensions, rather than in one dimension, and include shavings, discs, wafers, films, and strips of the polymeric material(s). Conventionally, the term "aspect ratio" is understood to be the ratio of one dimension, especially a dimension of a surface, to another dimension. As used herein, the phrase is taken to indicate the ratio of the diameter of the surface area of the largest side of a segment of polymeric material, treating or assuming such segment surface area to be circular, to the thickness of the particle (on average). Accordingly, the platelets utilized in the invention will possess an average aspect ratio of from about 10 to about 10,000, preferably 100 to 1000. Preferably, the platelets will be larger than 0.6 mm. in the longest dimension, the dimensions of a platelet which may be used in the invention being, for example, 15 mm.×5 mm.×0.5 mm.

The compositions of the invention may also include a minor portion of conventional fibers or platelets, as described in the aforesaid U. S. patents. Thus, a blend in the fluid or pack of the solid material of the invention and a minor amount, preferably less than 35 percent by volume of the solid material of the invention, of fibers of glass, ceramic, carbon, natural or synthetic polymers or metal filaments, etc., may be used or prepared. The density of the fibers used is preferably greater than one g/cm$^3$ to avoid separation by flotation in the fluid/particulate slurry. Preferably, the fiber density is in the range of 1 to 4 g/cm$^3$.

In certain cases, it may be preferred to pump the slurry of particulate material and solid material only during a portion of the job, for example, during the pumping of the last 10–25% of a proppant into the fracture, as a "tail-in" to control flowback in the most economical manner, or for other reasons.

The following experiments were conducted.

A test fracturing fluid was prepared by mixing 6 grams of guar and one liter of tap water. Three 500 ml. aliquots of this fluid were then each mixed with 500 grams of 20/40 proppant sand and 3.75 grams (0.75% by weight of proppant) of novoloid fibers (25 mm. long by 15 microns in diameter), and then mixed together. The proppant/fiber slurry formed was pumped through 4×12.7 cm. long, 22 mm. internal diameter connected tubes fitted with mesh at the outlet end. The fluid flowed through the mesh, leaving a pack of 20/40 proppant sand and Novoloid fiber. Residual solution was then washed from the pack for 30 minutes using a flow of tap water. The four tubes were then separated, and a washer with a 1.27 cm. diameter hole was fixed in position at one end of each of the four tubes. Water was then flowed through each tube, exiting each tube at the end with the washer. The flow rate was gradually increased until the sand/fiber pack failed, and the pressure drop across the tube and flow rate were recorded when the sand/fiber pack failed. The results from the four tubes were averaged. The pack failed at an average flow rate of 5.3 liters/min. and an average flowing pressure drop of 46 psig. across the tube.

II

The procedure of experiment I was repeated, except that only three sand pack tubes were tested and no fibers were used. The pack failed at an average flow rate of 0.35 liters/min., and an average flowing pressure drop of 0.75 psig. across the tube.

III

The procedure of Experiment I was repeated but the Novoloid fibers used were 10 mm. long by 15 microns in diameter. The pack failed at an average flow rate of 3.7 l/min and an average flowing pressure drop of 26 psig. across the tube.

IV

The procedure of Experiment I was repeated but the novoloid fibers used were 10 mm. long by 23 microns in diameter. The pack failed at an average flow rate of 3.7 liters/min. and a flowing pressure drop of 16 psig. across the pack.

V

The procedure of Experiment I was repeated but the novoloid fibers used were 10 mm. long by 33 microns in diameter. The pack failed at an average flow rate of 3.8 liters/min. and an average flowing pressure drop of 15 psig. across the pack.

VI

The procedure of Experiment I was repeated but 5 grams (1% by weight of proppant) of novoloid fibers 10 mm. long by 33 microns diameter were used. The pack failed at an average flow rate of 6.5 liters/min. and an average flowing pressure drop of 33 psig. across the pack.

VII

The procedure of experiment I was repeated but the proppant used was 16/20 mesh intermediate strength ceramic proppant (16/20 CARBOLITE™). Novoloid fibers (25 mm. long by 15 microns in diameter) were used at a concentration of 0.75% by weight of proppant. The pack failed at an average flow rate of 5.4 liters/min. and an average flowing pressure drop of 11 psig. across the pack.

VIII

The procedure of experiment VII was repeated except that only two sand pack tubes were tested and no fibers were used. The pack failed at an average flow rate of 0.703 liters/min. and an average flowing pressure drop of 0.2 psig. across the pack.

The results of experiments I and III through VII demonstrate clearly the improved sand pack stability obtained using the novoloid fibers of the invention, when compared with control experiments II and VIII.

IX

The following experiment was performed in a disk shaped cell. The diameter of the disk was 15.2 cm. and the thickness was 1.6±0.1 cm. The cell had inlet and outlet openings 10.2 cm. wide by 3.2 cm. high by 2 cm. deep which led to inlet and outlet ports 2.3 cm. in diameter. A screen was placed across the outlet port.

A slurry containing 1500 ml. of guar solution (initial concentration, 6 g/liter of guar), 1500 grams 16/20 mesh ceramic proppant, and 11.25 grams of novoloid fibers (15 microns diameter, 25 mm. long) was pumped into the cell and formed a pack against the screen. Remaining guar solution was washed from the pack, and the inlet, outlet ports and screen were removed. Excess proppant was removed from the ports before they were replaced. Closure stress of 1000 psig. was applied to the faces of the disk. The pack length from inlet to outlet was 19.2 cm. Water was then flowed through the pack from outlet to inlet until the pack failed. This coincided with a relaxation of the closure stress. The pressure and flow rate at failure in this experiment, and those of Experiments X and XI following, are shown in Table A.

X

The procedure of Experiment IX was repeated but 11.25 grams of novoloid fibers (15 micron in diameter, 10 mm. long) were used instead of the 25 mm. fibers.

XI

The procedure of Experiment IX was repeated but 22.5 grams of alkali resistant glass fibers (20 micron diameter, 12.7 mm. long) were used instead of the 25 mm. novoloid fibers.

TABLE A

|  | Fiber, length | Pressure At Failure | Flow Rate at Failure |
|---|---|---|---|
| Ex. IX | novoloid 25 mm. | 9.4 psig. | 10.1 l/min. |
| Ex. X | novoloid 10 mm. | 9.9 psig. | 9.0 l/min. |
| Ex. XI | glass 12.7 mm. | 5.0 psig. | 6.0 l/min. |

These data demonstrate that novoloid fibers (modulus 3.5 to 4.5 GPa) can provide greater pack strength than glass fibers (modulus 70 GPa).

XII

The following experiment was performed in a rectangular cell having internal dimensions of 17.8 cm.×3.8 cm.×5.0 cm. the internal volume being reduced by a rock insert to approximately 270 cc. The cell had inlet and outlet openings of 2.95 cm.±0.05 cm. in diameter in the smallest faces, and was set up with a screen at the outlet. A slurry comprising 6 g/liter of guar solution in water, 500 grams of 16/20 mesh ceramic proppant and 3.75 grams of novoloid fibers (15 micron diameter, 10 mm. long) was pumped into the cell and formed a pack against the exit screen. Residual guar solution was washed from the pack and excess proppant was removed from the inlet. A closure stress of 1000 psig. was applied to the face of the pack. Water was flowed from the outlet to the inlet through the length of the pack until the pack failed. The pressure across the middle 12.7 cm. of the pack at failure was measured as a function of flow rate and was used as a measure of pack strength. The result is shown, along with the results of Experiments XIII and XIV following, in Table B.

XIII

The procedure of Experiment XII was repeated but 3.75 grams of novoloid fibers (15 micron diameter, 25 mm. long) were used instead of the 10 mm. fibers.

XIV

The procedure of Experiment XII was repeated but 7.5 grams of alkali resistant glass fibers (20 micron diameter, 12.7 mm. long) were used instead of the 10 mm. novoloid fibers.

TABLE B

|  | Ex. XII | Ex. XIII | Ex. XIV |
|---|---|---|---|
| Pack Strength | 9.4 psig. | 9.4 psig. | 2.4 psig. |
| Flow Rate | 4.8 l/min. | 4.8 l/min. | 2.9 l/min. |

These data demonstrate that the novoloid fibers offer greater pack strength than the much higher modulus glass fibers.

XV

The procedure of experiment VII was repeated but the sample was aged for two weeks at 350° F. in water/steam prior to testing. The pack failed at a flow rate of 4.4 liters/min. and a flowing pressure drop of 7.9 psig. across the pack.

XVI

Samples of novoloid fibers, 15 micron in diameter, were weighed and immersed in 15% hydrochloric acid inside a corrosion resistant vessel. The vessel was heated to 1500° F. for 24 hours and then cooled. The fibers were removed, washed thoroughly in de-ionized water, and dried. The fibers were weighed and the percentage weight loss/gain calculated. The result is shown, along with the results of Experiments XVII and XVIII following, in Table C.

XVII

The procedure of experiment XVI was repeated except that a mixture of 12% hydrochloric acid and 3% hydrofluoric acid was used.

XVIII

The procedure of experiment XVI was repeated except that kerosene was used.

TABLE C

| | % Weight Gain | |
|---|---|---|
| Exp. XVI | Exp. XVII | Exp. XVIII |
| 2.87 | 4.45 | 1.73 |

These data demonstrate that novoloid fibers are not affected significantly by a variety of chemical substances.

XIX

A slurry containing 1.2 grams of guar in 500 ml. of water, 500 grams of 20/40 proppant sand, and 3.75 grams of novoloid fibers (15 microns diameter, 38 mm. long) was mixed at a speed of 2300 rpm for two minutes with a toothed impeller (2 sets of 9 teeth 6 mm. long) in a 13 cm. diameter beaker. After mixing, the slurry was poured on to absorbent pads. The fibers were examined visually and >90% were estimated to be of the original length.

XX

The procedure of experiment XIX was repeated except that 5 grams of low modulus pitch based carbon fibers (20 microns diameter, 25 mm. long) were used. After mixing, no fibers of the original length were observable, and >90% of the fibers were estimated to be than 6 mm. in length.

XXI

The procedure of experiment XIX was repeated except that 7.5 grams of alkali resistant glass fibers (20 microns diameter, 12.7 mm. long) were used. More than 50% of the fibers were estimated to be <6 mm long.

Having thus described the invention, those skilled in the art will recognize that such description is given by way of illustration and not by way of limitation, the invention being limited only by the scope of the appended claims.

What is claimed is:

1. A fluid suspension for treatment of a subterranean formation comprising a fluid, a particulate material, and a solid material selected from fibers and platelets of novoloid, or mixtures thereof; fibers and platelets of a novoloid-type polymer material, and mixtures thereof.

2. The fluid suspension of claim 1 wherein the fluid is selected from the group consisting of gelled oil, a gelled aqueous fluid, aqueous polymer solutions, aqueous surfactant solutions, viscous emulsions of water and oil, mixtures thereof; and mixtures of any one or more of the group with a gas.

3. The fluid suspension of claim 1 wherein the particulate material has an average particle size of from 10 mesh to 100 U.S. mesh, and comprises a member selected from the group consisting of sand, resin-coated sand, ceramic beads, silica beads, synthetic organic beads, glass microspheres, resin coated proppant, and sintered mineral particles.

4. The fluid suspension of claim 3 wherein the solid material is novoloid fiber.

5. The fluid suspension of claim 1 wherein the suspension also comprises a minor portion of fibers, platelets, or fibers and platelets of a material selected from glass, ceramic, carbon, natural or synthetic polymers or metal filaments, and mixtures thereof.

6. The fluid suspension of claim 1 wherein the fluid is a fracturing fluid and the particulate material is proppant.

7. The fluid suspension of claim 6 wherein the proppant has an average particle size of from 10 mesh to 100 U.S. mesh, and is present in the fluid in a concentration of from 1 lb/gallon to about 25 lbs/gallon of fluid.

8. The fluid suspension of claim 6 wherein the proppant comprises a member selected from the group consisting of sand, resin-coated sand, ceramic beads, silica beads, synthetic organic beads, glass microspheres, resin coated proppant, and sintered mineral particles.

9. The fluid suspension of claim 8 wherein the solid material is novoloid fiber.

10. The fluid suspension of claim 6 wherein the solid material is novoloid fiber.

11. The fluid suspension of claim 6 in which the solid material is present in an amount of from about 0.01 percent by weight to about 50 percent by weight of said proppant.

12. The fluid suspension of claim 11 wherein the proppant comprises a member selected from the group consisting of sand, resin-coated sand, ceramic beads, silica beads, synthetic organic beads, glass microspheres, resin coated proppant, and sintered mineral particles.

13. The fluid suspension of claim 12 wherein the solid material is fibers of novoloid.

14. The fluid suspension of claim 6 in which the solid material is present in an amount of from about 0.1 percent by weight to about 5.0 percent by weight of said proppant.

15. The fluid suspension of claim 14 wherein the solid material is fibers of novoloid.

16. The fluid suspension of claim 15 wherein the proppant has an average particle size of from 10 mesh to 100 U.S. mesh, and is present in the fluid in a concentration of from 1 lb/gallon to about 25 lbs/gallon of fluid.

17. In a subterranean formation penetrated by a wellbore, a porous pack comprising a particulate material in intimate mixture with a solid material selected from fibers and platelets of novoloid, or mixtures thereof; fibers and platelets of a novoloid-type polymer material, and mixtures thereof; and mixtures thereof.

18. The porous pack of claim 17 wherein the particulate material has an average particle size of from 10 mesh to 100 U.S. mesh.

19. The porous pack of claim 18 wherein the particulate material comprises a fracture proppant selected from the group consisting of sand, resin-coated sand, ceramic beads, silica beads, glass microspheres, synthetic organic beads, resin coated proppant, and sintered mineral particles.

20. The porous pack of claim 19 wherein the solid material is novoloid fiber.

21. The porous pack of claim 20 wherein the particulate material is gravel.

22. The porous pack of claim 20 wherein channels are formed within the porous pack, said channels comprising regions of reduced particulate concentration.

23. The porous pack of claim 17 wherein the solid material is novoloid fiber.

24. The porous pack of claim 17 wherein the pack also comprises a minor portion of fibers, platelets, or fibers and platelets of a material selected from glass, ceramic, carbon, natural or synthetic polymers or metal filaments, and mixtures thereof.

25. A method of treating an underground formation penetrated by a wellbore comprising
   providing a treatment fluid suspension, said treatment fluid suspension comprising a fluid, a particulate material, and a solid material selected from fibers and platelets of novoloid, or mixtures thereof; fibers and platelets of a novoloid-type polymer material, and mixtures thereof; and mixtures thereof;
   pumping the treatment fluid suspension downhole through a wellbore;
   depositing the treatment fluid suspension in the formation; and
   forming within the formation a porous pack of particulate material and said solid material.

26. The method of claim 25 wherein the porous pack is formed by allowing leakoff of the fluid into the formation or the formation and/or the wellbore.

27. The method of claim 25 wherein the particulate material is gravel.

28. The method of claim 25 wherein the particulate material is proppant, the fluid is a fracturing fluid, and the porous pack is formed by release of fracturing pressure and flow of fracturing fluid into the wellbore.

29. The method of claim 28 wherein the proppant comprises a member selected from the group consisting of sand, resin-coated sand, ceramic beads, silica beads, glass microspheres, synthetic organic beads, resin coated proppant, and sintered mineral particles.

30. The method of claim 29 wherein the particulate material is proppant and the fluid is a fracturing fluid.

31. The method of claim 30 in which the solid material is present in an amount of from about 0.01 percent by weight to about 50 percent by weight of said proppant.

32. The method of claim 31 in which the proppant comprises a member selected from the group consisting of sand, resin-coated sand, ceramic beads, silica beads, synthetic organic beads, glass microspheres, resin coated proppant, and sintered mineral particles.

33. The method of claim 32 wherein the solid material is fibers of novoloid.

34. The method of claim 30 in which the solid material is present in an amount of from about 0.1 percent by weight to about 5.0 percent by weight of said proppant.

35. The method of claim 34 wherein the solid material is fibers of novoloid.

36. The method of claim 35 wherein the proppant has an average particle size of from 10 mesh to 100 U.S. mesh, and is present in the fluid in a concentration of from 1 lb/gallon to about 25 lbs/gallon of fluid.

37. The method of claim 28 wherein the solid material is novoloid fiber.

38. The method of claim 25 wherein the solid material is novoloid fiber.

39. A method of treating an underground formation penetrated by a wellbore comprising providing a treatment fluid suspension, said treatment fluid suspension comprising a fluid, a particulate material, and a solid material selected from fibers and platelets, or mixtures thereof, of novolac resin;

pumping the treatment fluid suspension downhole through a wellbore;

depositing the treatment fluid suspension in the formation; and forming within the formation a porous pack of particulate material and said solid material comprising fibers and platelets, or mixtures thereof, of novolac resin;

flushing the porous pack with a curing agent for novolac resin, and curing at least a portion of the fibers and platelets, or mixtures thereof, of novolac resin, in the formation.

40. The method of claim 39 wherein the fluid is a fracturing fluid and the particulate material is proppant.

41. The method of claim 40 in which the proppant comprises a member selected from the group consisting of sand, resin-coated sand, ceramic beads, silica beads, synthetic organic beads, glass microspheres, resin coated proppant, and sintered mineral particles.

42. The method of claim 41 in which the solid material is present in an amount of from about 0.1 percent by weight to about 5.0 percent by weight of said proppant.

43. The method of claim 42 wherein the proppant has an average particle size of from 10 mesh to 100 U.S. mesh, and is present in the fluid in a concentration of from 1 lb/gallon to about 25 lbs/gallon of fluid.

* * * * *